United States Patent
Lee et al.

(10) Patent No.: US 12,467,100 B2
(45) Date of Patent: Nov. 11, 2025

(54) **CRISPR-Cas-BASED COMPOSITION FOR *SALMONELLA* DETECTION AND *SALMONELLA* DETECTION METHOD USING SAME**

(71) Applicant: PULMUONE CO., LTD., Chungcheongbuk-do (KR)

(72) Inventors: Sang Yong Lee, Cheongju-si (KR); Young Min Park, Cheongju-si (KR); Sang Gu Kim, Cheongju-si (KR); Sang Yoon Lee, Cheongju-si (KR); Hyo Yul Lee, Chungcheongbuk-do (KR)

(73) Assignee: PULMUONE CO., LTD., Chungcheongbuk-do (KR)

( * ) Notice: Subject to any disclaimer, the term of this patent is extended or adjusted under 35 U.S.C. 154(b) by 0 days.

(21) Appl. No.: 18/841,241

(22) PCT Filed: Feb. 16, 2023

(86) PCT No.: PCT/KR2023/002300
§ 371 (c)(1),
(2) Date: Aug. 23, 2024

(87) PCT Pub. No.: WO2023/163458
PCT Pub. Date: Aug. 31, 2023

(65) Prior Publication Data
US 2025/0109447 A1    Apr. 3, 2025

(30) Foreign Application Priority Data
Feb. 23, 2022 (KR) .................. 10-2022-0023357

(51) Int. Cl.
*C12Q 1/68* (2018.01)
*C12N 9/22* (2006.01)
*C12N 15/11* (2006.01)
*C12Q 1/6844* (2018.01)
*C12Q 1/689* (2018.01)

(52) U.S. Cl.
CPC .............. *C12Q 1/689* (2013.01); *C12N 9/22* (2013.01); *C12N 15/11* (2013.01); *C12Q 1/6844* (2013.01); *C12N 2310/20* (2017.05)

(58) Field of Classification Search
None
See application file for complete search history.

(56) References Cited

U.S. PATENT DOCUMENTS

| 2003/0050470 A1* | 3/2003 | An .................... C07H 21/00 435/6.14 |
| 2004/0023207 A1* | 2/2004 | Polansky ............. A61K 48/005 435/456 |

FOREIGN PATENT DOCUMENTS

| CN | 105274232 A | * | 1/2016 | |
| CN | 108913770 A | * | 11/2018 | |
| CN | 110684823 A | | 1/2020 | |
| CN | 111621578 A | | 9/2020 | |
| KR | 10-2021-0143580 A | | 11/2021 | |
| WO | WO-2022179494 A1 | * | 9/2022 | ........... C12Q 1/6844 |
| WO | WO-2023163458 A1 | * | 8/2023 | |

OTHER PUBLICATIONS

An, and Cui, L., 2021. Rapid and sensitive detection of *Salmonella* spp. using CRISPR-Cas13a combined with recombinase polymerase amplification. Frontiers in Microbiology, vol. 12, 732426, pp. 1-8. (Year: 2021).*
Gadberry MD, Malcomber ST, Doust AN, Kellogg EA. Primaclade—a flexible tool to find conserved PCR primers across multiple species. Bioinformatics. Apr. 1, 2005; 21(7):1263-4. Epub Nov. 11, 2004. (Year: 2004).*
Genbank Accession No. AE006468—*Salmonella enterica* subsp. *enterica* serovar *Typhimurium* str. LT2, complete genome, submitted on Jan. 16, 2016, retrieved on Jan. 28, 2025 from http://www.ncbi.nlm.nih.gov/nuccore/AE006468). (Year: 2016).*
Horlacher et al., 1997. Characterization of TreR, the Major Regulator of the*Escherichia coli*Trehalose System. Journal of Biological Chemistry, 272(20), pp. 13026-13032. (Year: 1997).*
Liu et al., Epub Apr. 12, 2022. Development of rapid and easy detection of *Salmonella* in food matrics using RPA-CRISPR/Cas12a method. Lwt, 162, 113443, pp. 1-8. (Year: 2022).*
Mao and Wang, F., 2022. Sensitive and high-accuracy detection of *Salmonella* based on CRISPR/Cas12a combined with recombinase polymerase amplification. Letters in Applied Microbiology, 75(4), pp. 899-907. (Year: 2022).*
Mao et al., 2022, Supplementary, Letters in Applied Microbiology, 75(4), pp. 899-907 (Year: 2022).*
Marechal., 1984. Transport and metabolism of trehalose in *Escherichia coli* and *Salmonella typhimurium*. Archives of microbiology, 137, pp. 70-73. (Year: 1984).*
SantaLucia Jr, John. Physical principles and visual-OMP software for optimal PCR design. PCR Primer Design. Humana Press, 2007: pp. 3-33. (Year: 2007).*

(Continued)

*Primary Examiner* — Gary Benzion
*Assistant Examiner* — Olayinka A Oyeyemi
(74) *Attorney, Agent, or Firm* — Meunier Carlin & Curfman LLC

(57) ABSTRACT

The present invention relates to a CRISPR-Cas based composition for detecting *Salmonella* and a method for detecting *Salmonella* using the same, more specifically, to a composition for detecting *Salmonella* comprising primers capable of specifically amplifying *Salmonella* through isothermal amplification, guide RNA, and CRISPR-Cas proteins, and a method for detecting *Salmonella* using the same.

14 Claims, 11 Drawing Sheets
Specification includes a Sequence Listing.

(56) References Cited

OTHER PUBLICATIONS

Tian et al., 2021. An ultrasensitive and contamination-free on-site nucleic acid detection platform for Listeria monocytogenes based on the CRISPR-Cas12a system combined with recombinase polymerase amplification. Lwt, 152, 112166, pp. 1-7. (Year: 2021).*
CN108913770A_Descripition is English Translation of CN108913770A, pub Nov. 30, 2018 (Year: 2018).*
CN105274232A_Descripition is English Translation of CN105274232A, pub Jan. 27, 2016 (Year: 2016).*
Notification of Preliminary Rejection, Korean Patent Application No. 10-2022-0023357, Filing Date: Feb. 23, 2022, 2 pages.
Granted Claims of Korean Patent Application No. 10-2022-0023357, Filing Date: Feb. 23, 2022, 2 pages.
International Search Report and Written Opinion received in PCT/KR2023/002300 mailed May 12, 2023.
Kim et al., Roles of YehZ, a Putative Osmoprotectant Transporter, in Tempering Growth of *Salmonella enterica serovar Typhimurium*. Journal of Microbiology and Biotechnology. 2013, vol. 23, No. 11, pp. 1560-1568. See page 1564.
GenBank Accession No. CP069164.I. *Salmonella enterica* subsp. *enterica serovar Typhimurium* strain FD01851333 chromosome (publication: Feb. 7, 2022). Retrieved from <URL: https://www.ncbi.nlm.nih.gov/nuccore/CP069 I 64. I/> See the entire main text.
Zhang, T. et al. Direct Detection of Foodborne Pathogens via a Proximal DNA Probe-Based CRISPRCasl2 Assay. Journal of Agricultural and Food Chemistry. 2021, vol. 69, No. 43, pp. 12828-12836 (publication: Oct. 25, 2021). See abstract and p. 12830.
Office Action received in corresponding Korean Application No. 10-2022-0023357 mailed May 20, 2023.

* cited by examiner

*Salmonella enterica* subsp. enterica serovar Typhimurium str. LT2

Size : About 4.85 million bp

FIG. 1F

| Contig NO. | Gene | PAM | Target sequence |
|---|---|---|---|
| 36062 | Intergenic | TTTG | GAAGGTTTTTGATAAAGCAATCCT (SEQ ID NO: 56) |
| 50260 | shdA | TTTC | ACCAGCGAGCCGCTGCCGGAAAGG (SEQ ID NO: 57) |
| 53469 | treC | TTTG | ATATGCGGCGGATGCCACTCCTGG (SEQ ID NO: 58) |

FIG. 2A

RPA Primer design

| Contig NO. | Gene | PAM | Target sequence |
|---|---|---|---|
| 36062 | Intergenic | TTTG | GAAGGTTTTTGATAAAGCAATCCT (SEQ ID NO: 56) |
| 50260 | shdA | TTTC | ACCAGCGAGCCGCTGCCGGAAAGG (SEQ ID NO: 57) |
| 53469 | treC | TTTG | ATATGCGGCGGATGCCACTCCTGG (SEQ ID NO: 58) |

| RPA-Forward primer | RPA-Reverse primer | SIZE(bp) |
|---|---|---|
| TGATACGCAGACCAGAAGACAGACGCTCGATA (SEQ ID NO: 59) | TCAATTGTTGACACCCGAATATACCCAATAGT (SEQ ID NO: 60) | 244 |
| TATCGCCGCTGCCCAGCGAATCCGCATGGTCA (SEQ ID NO: 61) | TGAGCTGATCGTGACCGGCGATAACAACTACA (SEQ ID NO:62) | 290 |
| TTGTAACCACCAGATGGCTTCAAATGGGCGGA (SEQ ID NO: 63) | TAGCCCATCAGTATGGTGTTATCGCCGCCAGT (SEQ ID NO: 64) | 202 |

FIG. 2B

Results of RPA amplification using 13 serotypes and 16 standard strains

| Bacteria | Serotype | Strain | intergenic | shdA | treC |
|---|---|---|---|---|---|
| Salmonella enterica | Enteritidis | ATCC 13076 | - | + | + |
|  |  | NCCP 12243 | - | + | + |
|  |  | CCARM 8570 | + | + | + |
|  | Typhimurium | ATCC 14028 | + | + | + |
|  |  | CCARM 8579 | + | - | + |
|  | Braenderup | ATCC BAA664 | + | - | + |
|  | Typhi | IMSNU 13033 | + | - | + |
|  | Thompson | CCARM 8450 | - | + | + |
|  | Saintpaul | CCARM 8581 | + | + | + |
|  | Paratyphi | NCCP 13693 | + | - | + |
|  | Virchow | NCCP 13688 | - | - | + |
|  | Senftenberg | NCCP 12240 | + | - | + |
|  | Newport | NCCP 13686 | - | - | + |
|  | Montevideo | NCCP 13704 | + | - | + |
|  | London | NCCP 10357 | + | - | + |
|  | Infantis | NCCP 13683 | + | - | + |

+Amplified, - unamplified

FIG. 4

| Bacteria | Serotype | Strain | treC gRNA |
|---|---|---|---|
| E. coli | O157 | NCCP 15739 | - |
| | O103 | NCCP 15956 | - |
| | O26 | NCCP 15961 | - |
| | O111 | NCCP 13581 | - |
| | O91 | NCCP 15957 | - |
| | O8 | NCCP 15655 | - |
| | O121 | NCCP 12551 | - |
| | O145 | NCCP 15954 | - |
| | O6 | NCCP 15740 | - |
| | O159 | NCCP 15731 | - |
| | O25 | NCCP 16186 | - |
| | O15 | NCCP 14038 | - |
| | O11 | NCCP 15647 | - |
| | O3 | NCCP 15651 | - |
| | O25ac:H- | NCCP 16299 | - |
| | O164 | NCCP 12584 | - |
| | - | KCTC 1682 | - |
| Shigella sonnei | - | KCTC 2009 | - |
| Staphylococcus aureus | - | KCTC 1621 | - |
| Yersinia enterocolitica | - | ATCC 23715 | - |
| Bacillus cereus | - | KCTC 3624 | - |
| Clostridium perfringens | - | ATCC 13124 | - |
| Listeria monocytogenes | - | NCCP 14714 | - |
| Vibrio parahaemolyticus | - | ATCC 13042 | - |

SEQUENCE LISTING

```
Sequence total quantity: 64
SEQ ID NO: 1          moltype = DNA  length = 32
FEATURE               Location/Qualifiers
misc_feature          1..32
                      note = treC_forward primer
```

```
SEQ ID NO: 1            moltype = DNA   length = 32
FEATURE                 Location/Qualifiers
misc_feature            1..32
                        note = treC_forward primer
source                  1..32
                        mol_type = other DNA
                        organism = synthetic construct
SEQUENCE: 1
ttgtaaccac cagatggctt caaatgggcg ga                                  32

SEQ ID NO: 2            moltype = DNA   length = 32
FEATURE                 Location/Qualifiers
misc_feature            1..32
                        note = treC_reverse primer
source                  1..32
                        mol_type = other DNA
                        organism = synthetic construct
SEQUENCE: 2
tagcccatca gtatggtgtt atcgccgcca gt                                  32

SEQ ID NO: 3            moltype = RNA   length = 24
FEATURE                 Location/Qualifiers
misc_feature            1..24
                        note = treC_gRNA
source                  1..24
                        mol_type = other RNA
                        organism = synthetic construct
SEQUENCE: 3
atatgcggcg gatgccactc ctgg                                           24

SEQ ID NO: 4            moltype = DNA   length = 28
FEATURE                 Location/Qualifiers
source                  1..28
                        mol_type = genomic DNA
                        organism = Salmonella sp.
SEQUENCE: 4
tttgatattg aagcgctctc cgatcgcg                                       28

SEQ ID NO: 5            moltype = DNA   length = 28
FEATURE                 Location/Qualifiers
source                  1..28
                        mol_type = genomic DNA
                        organism = Salmonella sp.
SEQUENCE: 5
tttggccatc tcggcaaaat gcttttcc                                       28

SEQ ID NO: 6            moltype = DNA   length = 28
FEATURE                 Location/Qualifiers
source                  1..28
                        mol_type = genomic DNA
                        organism = Salmonella sp.
SEQUENCE: 6
tttcgccttc cggggtgact tcaaacag                                       28

SEQ ID NO: 7            moltype = DNA   length = 28
FEATURE                 Location/Qualifiers
source                  1..28
                        mol_type = genomic DNA
                        organism = Salmonella sp.
SEQUENCE: 7
tttgagaaag atcgcgctcg tcgttcca                                       28

SEQ ID NO: 8            moltype = DNA   length = 28
FEATURE                 Location/Qualifiers
source                  1..28
                        mol_type = genomic DNA
                        organism = Salmonella sp.
SEQUENCE: 8
tttaacaggt gacgttctgt tactgaaa                                       28

SEQ ID NO: 9            moltype = DNA   length = 28
FEATURE                 Location/Qualifiers
source                  1..28
                        mol_type = genomic DNA
                        organism = Salmonella sp.
SEQUENCE: 9
tttatccttc ggttgaaaaa tgtgagta                                       28

SEQ ID NO: 10           moltype = DNA   length = 28
FEATURE                 Location/Qualifiers
source                  1..28
                        mol_type = genomic DNA
                        organism = Salmonella sp.
```

-continued

```
SEQUENCE: 10
tttcgcctcg acgacttcag taccggcg                                              28

SEQ ID NO: 11           moltype = DNA   length = 28
FEATURE                 Location/Qualifiers
source                  1..28
                        mol_type = genomic DNA
                        organism = Salmonella sp.
SEQUENCE: 11
tttccagcgt gagggtactc attagcag                                              28

SEQ ID NO: 12           moltype = DNA   length = 28
FEATURE                 Location/Qualifiers
source                  1..28
                        mol_type = genomic DNA
                        organism = Salmonella sp.
SEQUENCE: 12
tttcgcgcag gcgagtgagc ataatttg                                              28

SEQ ID NO: 13           moltype = DNA   length = 28
FEATURE                 Location/Qualifiers
source                  1..28
                        mol_type = genomic DNA
                        organism = Salmonella sp.
SEQUENCE: 13
tttattctta tttttctgac taccctgt                                              28

SEQ ID NO: 14           moltype = DNA   length = 28
FEATURE                 Location/Qualifiers
source                  1..28
                        mol_type = genomic DNA
                        organism = Salmonella sp.
SEQUENCE: 14
tttctgctgc tgggcgcggc gaccctac                                              28

SEQ ID NO: 15           moltype = DNA   length = 28
FEATURE                 Location/Qualifiers
source                  1..28
                        mol_type = genomic DNA
                        organism = Salmonella sp.
SEQUENCE: 15
tttccagtaa tcatagtacg gatggcga                                              28

SEQ ID NO: 16           moltype = DNA   length = 28
FEATURE                 Location/Qualifiers
source                  1..28
                        mol_type = genomic DNA
                        organism = Salmonella sp.
SEQUENCE: 16
tttagccgcc cgtaattccg cccgcata                                              28

SEQ ID NO: 17           moltype = DNA   length = 28
FEATURE                 Location/Qualifiers
source                  1..28
                        mol_type = genomic DNA
                        organism = Salmonella sp.
SEQUENCE: 17
tttggataaa aaagtggtcg aaccgctg                                              28

SEQ ID NO: 18           moltype = DNA   length = 28
FEATURE                 Location/Qualifiers
source                  1..28
                        mol_type = genomic DNA
                        organism = Salmonella sp.
SEQUENCE: 18
tttccgcgac gatttcaacg ttaagcgc                                              28

SEQ ID NO: 19           moltype = DNA   length = 28
FEATURE                 Location/Qualifiers
source                  1..28
                        mol_type = genomic DNA
                        organism = Salmonella sp.
SEQUENCE: 19
tttcgcatgg attctgggaa cgcttctt                                              28

SEQ ID NO: 20           moltype = DNA   length = 28
FEATURE                 Location/Qualifiers
source                  1..28
                        mol_type = genomic DNA
```

```
                              organism = Salmonella sp.
SEQUENCE: 20
tttcctcaaa gaaaaagggg ttgtggac                                              28

SEQ ID NO: 21            moltype = DNA   length = 28
FEATURE                  Location/Qualifiers
source                   1..28
                         mol_type = genomic DNA
                         organism = Salmonella sp.
SEQUENCE: 21
tttctttatc cagaccatag cgacgcgt                                              28

SEQ ID NO: 22            moltype = DNA   length = 28
FEATURE                  Location/Qualifiers
source                   1..28
                         mol_type = genomic DNA
                         organism = Salmonella sp.
SEQUENCE: 22
tttgtgtacc agcgccgtgc gctgaacg                                              28

SEQ ID NO: 23            moltype = DNA   length = 28
FEATURE                  Location/Qualifiers
source                   1..28
                         mol_type = genomic DNA
                         organism = Salmonella sp.
SEQUENCE: 23
tttccgggat gtattctgcg gtaaactc                                              28

SEQ ID NO: 24            moltype = DNA   length = 28
FEATURE                  Location/Qualifiers
source                   1..28
                         mol_type = genomic DNA
                         organism = Salmonella sp.
SEQUENCE: 24
tttcagcgac gcttcaatac ctgctttg                                              28

SEQ ID NO: 25            moltype = DNA   length = 28
FEATURE                  Location/Qualifiers
source                   1..28
                         mol_type = genomic DNA
                         organism = Salmonella sp.
SEQUENCE: 25
tttgcgctcc ggcgccgtga ccggcaat                                              28

SEQ ID NO: 26            moltype = DNA   length = 28
FEATURE                  Location/Qualifiers
source                   1..28
                         mol_type = genomic DNA
                         organism = Salmonella sp.
SEQUENCE: 26
tttccctata aaaagagggc gattaggt                                              28

SEQ ID NO: 27            moltype = DNA   length = 28
FEATURE                  Location/Qualifiers
source                   1..28
                         mol_type = genomic DNA
                         organism = Salmonella sp.
SEQUENCE: 27
tttcagtagt tcttcaattc cttttta                                               28

SEQ ID NO: 28            moltype = DNA   length = 28
FEATURE                  Location/Qualifiers
source                   1..28
                         mol_type = genomic DNA
                         organism = Salmonella sp.
SEQUENCE: 28
tttgcgcgcc gatgttgatt atccagtt                                              28

SEQ ID NO: 29            moltype = DNA   length = 28
FEATURE                  Location/Qualifiers
source                   1..28
                         mol_type = genomic DNA
                         organism = Salmonella sp.
SEQUENCE: 29
tttatattat ttcttttaat ggcgtaat                                              28

SEQ ID NO: 30            moltype = DNA   length = 28
FEATURE                  Location/Qualifiers
source                   1..28
```

```
                        mol_type = genomic DNA
                        organism = Salmonella sp.
SEQUENCE: 30
tttgagccga ccattctgac ccatatta                                           28

SEQ ID NO: 31           moltype = DNA  length = 28
FEATURE                 Location/Qualifiers
source                  1..28
                        mol_type = genomic DNA
                        organism = Salmonella sp.
SEQUENCE: 31
tttcctaacg tgttgtattg catgactc                                           28

SEQ ID NO: 32           moltype = DNA  length = 28
FEATURE                 Location/Qualifiers
source                  1..28
                        mol_type = genomic DNA
                        organism = Salmonella sp.
SEQUENCE: 32
tttacgcttt taacatgcgg ctagccgg                                           28

SEQ ID NO: 33           moltype = DNA  length = 28
FEATURE                 Location/Qualifiers
source                  1..28
                        mol_type = genomic DNA
                        organism = Salmonella sp.
SEQUENCE: 33
tttcgcgttg caggcaggcg gcaagtta                                           28

SEQ ID NO: 34           moltype = DNA  length = 28
FEATURE                 Location/Qualifiers
source                  1..28
                        mol_type = genomic DNA
                        organism = Salmonella sp.
SEQUENCE: 34
tttgattctt tatttgtgat aagggttt                                           28

SEQ ID NO: 35           moltype = DNA  length = 28
FEATURE                 Location/Qualifiers
source                  1..28
                        mol_type = genomic DNA
                        organism = Salmonella sp.
SEQUENCE: 35
tttccagcag cagcgggaag ttcaccgc                                           28

SEQ ID NO: 36           moltype = DNA  length = 28
FEATURE                 Location/Qualifiers
source                  1..28
                        mol_type = genomic DNA
                        organism = Salmonella sp.
SEQUENCE: 36
tttatgtcgc tggaattggg aggccggg                                           28

SEQ ID NO: 37           moltype = DNA  length = 28
FEATURE                 Location/Qualifiers
source                  1..28
                        mol_type = genomic DNA
                        organism = Salmonella sp.
SEQUENCE: 37
tttgtgaatg gtcgcccgga ctgggata                                           28

SEQ ID NO: 38           moltype = DNA  length = 28
FEATURE                 Location/Qualifiers
source                  1..28
                        mol_type = genomic DNA
                        organism = Salmonella sp.
SEQUENCE: 38
tttctctttc agcgcctgcg ctaaacgg                                           28

SEQ ID NO: 39           moltype = DNA  length = 28
FEATURE                 Location/Qualifiers
source                  1..28
                        mol_type = genomic DNA
                        organism = Salmonella sp.
SEQUENCE: 39
tttaccttat attgaagtta agaaatag                                           28

SEQ ID NO: 40           moltype = DNA  length = 28
FEATURE                 Location/Qualifiers
```

```
source                  1..28
                        mol_type = genomic DNA
                        organism = Salmonella sp.
SEQUENCE: 40
tttgcgcgca acggcatcc gttaaaaa                                              28

SEQ ID NO: 41           moltype = DNA   length = 28
FEATURE                 Location/Qualifiers
source                  1..28
                        mol_type = genomic DNA
                        organism = Salmonella sp.
SEQUENCE: 41
tttaatccct atggcaaaac gagagaga                                             28

SEQ ID NO: 42           moltype = DNA   length = 28
FEATURE                 Location/Qualifiers
source                  1..28
                        mol_type = genomic DNA
                        organism = Salmonella sp.
SEQUENCE: 42
tttgttgcgt ctgccgctgt tttataac                                             28

SEQ ID NO: 43           moltype = DNA   length = 28
FEATURE                 Location/Qualifiers
source                  1..28
                        mol_type = genomic DNA
                        organism = Salmonella sp.
SEQUENCE: 43
tttcgccaat gatttcccgc tttacgac                                             28

SEQ ID NO: 44           moltype = DNA   length = 28
FEATURE                 Location/Qualifiers
source                  1..28
                        mol_type = genomic DNA
                        organism = Salmonella sp.
SEQUENCE: 44
tttcgcgatc aagacgtttg agtaaaaa                                             28

SEQ ID NO: 45           moltype = DNA   length = 28
FEATURE                 Location/Qualifiers
source                  1..28
                        mol_type = genomic DNA
                        organism = Salmonella sp.
SEQUENCE: 45
tttcatcata aggaacttca tagaaagc                                             28

SEQ ID NO: 46           moltype = DNA   length = 28
FEATURE                 Location/Qualifiers
source                  1..28
                        mol_type = genomic DNA
                        organism = Salmonella sp.
SEQUENCE: 46
tttctcaaag ttacgacttg caaatatt                                             28

SEQ ID NO: 47           moltype = DNA   length = 24
FEATURE                 Location/Qualifiers
source                  1..24
                        mol_type = genomic DNA
                        organism = Salmonella sp.
SEQUENCE: 47
attattgctc aattcgcaaa aatc                                                 24

SEQ ID NO: 48           moltype = DNA   length = 24
FEATURE                 Location/Qualifiers
source                  1..24
                        mol_type = genomic DNA
                        organism = Salmonella sp.
SEQUENCE: 48
agcactgatt cagagttgag tacg                                                 24

SEQ ID NO: 49           moltype = DNA   length = 24
FEATURE                 Location/Qualifiers
source                  1..24
                        mol_type = genomic DNA
                        organism = Salmonella sp.
SEQUENCE: 49
atatgcggcg gatgccactc ctgg                                                 24

SEQ ID NO: 50           moltype = DNA   length = 24
```

| | | |
|---|---|---|
| FEATURE | Location/Qualifiers | |
| source | 1..24 | |
| | mol_type = genomic DNA | |
| | organism = Salmonella sp. | |
| SEQUENCE: 50 | | |
| cgagcgcagg caacgccgct gatg | | 24 |

SEQ ID NO: 51    moltype = DNA  length = 24
FEATURE    Location/Qualifiers
source    1..24
    mol_type = genomic DNA
    organism = Salmonella sp.
SEQUENCE: 51
gaaggttttt gataaagcaa tcct    24

SEQ ID NO: 52    moltype = DNA  length = 24
FEATURE    Location/Qualifiers
source    1..24
    mol_type = genomic DNA
    organism = Salmonella sp.
SEQUENCE: 52
cgttctgatg taatctgaat cagt    24

SEQ ID NO: 53    moltype = DNA  length = 24
FEATURE    Location/Qualifiers
source    1..24
    mol_type = genomic DNA
    organism = Salmonella sp.
SEQUENCE: 53
cgagcgcagg caacgccgct gatg    24

SEQ ID NO: 54    moltype = DNA  length = 24
FEATURE    Location/Qualifiers
source    1..24
    mol_type = genomic DNA
    organism = Salmonella sp.
SEQUENCE: 54
accagcgagc cgctgccgga aagg    24

SEQ ID NO: 55    moltype = DNA  length = 24
FEATURE    Location/Qualifiers
source    1..24
    mol_type = genomic DNA
    organism = Salmonella sp.
SEQUENCE: 55
agcactgatt cagattacat caga    24

SEQ ID NO: 56    moltype = DNA  length = 24
FEATURE    Location/Qualifiers
source    1..24
    mol_type = genomic DNA
    organism = Salmonella sp.
SEQUENCE: 56
gaaggttttt gataaagcaa tcct    24

SEQ ID NO: 57    moltype = DNA  length = 24
FEATURE    Location/Qualifiers
source    1..24
    mol_type = genomic DNA
    organism = Salmonella sp.
SEQUENCE: 57
accagcgagc cgctgccgga aagg    24

SEQ ID NO: 58    moltype = DNA  length = 24
FEATURE    Location/Qualifiers
source    1..24
    mol_type = genomic DNA
    organism = Salmonella sp.
SEQUENCE: 58
atatgcggcg gatgccactc ctgg    24

SEQ ID NO: 59    moltype = DNA  length = 32
FEATURE    Location/Qualifiers
source    1..32
    mol_type = other DNA
    organism = synthetic construct
SEQUENCE: 59
tgatacgcag accagaagac agacgctcga ta    32

```
SEQ ID NO: 60          moltype = DNA  length = 32
FEATURE                Location/Qualifiers
source                 1..32
                       mol_type = other DNA
                       organism = synthetic construct
SEQUENCE: 60
tcaattgttg acacccgaat atcccaata gt                                        32

SEQ ID NO: 61          moltype = DNA  length = 32
FEATURE                Location/Qualifiers
source                 1..32
                       mol_type = other DNA
                       organism = synthetic construct
SEQUENCE: 61
tatcgccgct gcccagcgaa tccgcatggt ca                                       32

SEQ ID NO: 62          moltype = DNA  length = 32
FEATURE                Location/Qualifiers
source                 1..32
                       mol_type = other DNA
                       organism = synthetic construct
SEQUENCE: 62
tgagctgatc gtgaccggcg ataacaacta ca                                       32

SEQ ID NO: 63          moltype = DNA  length = 32
FEATURE                Location/Qualifiers
source                 1..32
                       mol_type = other DNA
                       organism = synthetic construct
SEQUENCE: 63
ttgtaaccac cagatggctt caaatgggcg ga                                       32

SEQ ID NO: 64          moltype = DNA  length = 32
FEATURE                Location/Qualifiers
source                 1..32
                       mol_type = other DNA
                       organism = synthetic construct
SEQUENCE: 64
tagcccatca gtatggtgtt atcgccgcca gt                                       32
```

CRISPR-Cas-BASED COMPOSITION FOR *SALMONELLA* DETECTION AND *SALMONELLA* DETECTION METHOD USING SAME

TECHNICAL FIELD

This application is a U.S. National Stage application filed under 35 U.S.C. § 371 of PCT/KR2023/002300 filed Feb. 16, 2023, which claims priority to Korean Patent Application No. 10-2022-0023357, filed on Feb. 23, 2022, and the entire disclosures of which are incorporated herein by reference.

The present invention relates to a composition for detecting *Salmonella* based on CRISPR-Cas and a method for detecting *Salmonella* using the same, more specifically to a composition for detecting *Salmonella* comprising a primer pair, guide RNA, and CRISPR-Cas protein capable of specifically amplifying *Salmonella* through isothermal amplification, and a method for detecting *Salmonella* using the same.

BACKGROUND OF THE INVENTION

*Salmonella* is one of the most frequent causative agents of food poisoning both domestically and internationally. With the recent increase in group catering, the number of patients per incident has risen, making it a pathogen of significant public health concern. The genus *Salmonella* forms a single group based on DNA-DNA hybridization, showing 99% homology with *Escherichia coli*. According to the proposal of the World Health Organization (WHO) Collaborating Centre, it is classified into two species [*Salmonella enterica* and *Salmonella bongori* (V)] and six subspecies [*Salmonella enterica* subsp. *enterica* (I), *Salmonella enterica* subsp. *salamae* (II), *Salmonella enterica* subsp. *arizonae* (IIIa), *Salmonella enterica* subsp. *diarizonae* (IIb), *Salmonella enterica* subsp. *houtenae* (IV), *Salmonella enterica* subsp. *indica* (VI)].

The serotypes of *Salmonella* have been identified based on the Kaufmann-White classification, which relies on somatic antigens (O) and flagellar antigens (Phase I, II flagellin; H). To date, 46 O serotypes and 114 H serotypes have been identified, with a total of 2,523 different serotypes recognized. Identifying *Salmonella* serotypes is fundamental in epidemiological studies. Traditional serological methods require the availability of all sera for serotype identification and the acquisition of antisera for new serotypes as they emerge. Consequently, identification is performed in a limited number of accredited laboratories, and results may vary depending on the expressed phenotype. Additionally, unidentified isolates must be sent to the Pasteur Institute for serotype identification, which is cumbersome.

Meanwhile, *Salmonella* is a representative pathogenic microorganism causing food poisoning and is the causative agent of typhoid and paratyphoid fever, which are classified as first-class notifiable infectious diseases. *Salmonella* is a Gram-negative, non-spore-forming, facultatively anaerobic *bacillus*, classified into over 2,800 serotypes. Among these, *Salmonella enterica* is the representative species causing food poisoning, accounting for about 50% of disease occurrences. Notably, *Salmonella enterica* subsp. *enterica* I accounts for 99% of all human *Salmonella* infections.

According to the data on the incidence of food poisoning by causative agents from the Food Poisoning Statistics System of the Ministry of Food and Drug Safety of Korea (2002-2014), the number of food poisoning cases caused by *Salmonella* has been steadily increasing each year.

Therefore, there is a need to develop a method that can rapidly and accurately detect *Salmonella* strains, such as subtypes and serotypes, which frequently cause food poisoning.

SUMMARY OF INVENTION

Problems to be Solved

Accordingly, the present inventor has discovered the present invention by developing a CRISPR-Cas-based rapid detection method that can simultaneously target the top 10 serotypes (88.8% of all serotypes) among 32 serotypes of *Salmonella* isolated from domestic food, clinical, and environmental sources from 2012 to 2018, using a primer pair consisting of the nucleotide sequences of SEQ ID NO: 1 and SEQ ID NO: 2, and optionally guide RNA and CRISPR-Cas proteins, to detect *Salmonella* with very high sensitivity and specificity.

Therefore, an object of the present invention is to provide a primer pair for detecting *Salmonella*, comprising a forward primer consisting of the nucleotide sequence of SEQ ID NO: 1 and a reverse primer consisting of the nucleotide sequence of SEQ ID NO: 2.

Another object of the present invention is to provide a composition for detecting *Salmonella*, comprising the primer pair of SEQ ID NOs: 1 and 2, guide RNA, and an endonuclease.

Another object of the present invention is to provide a composition for detecting *Salmonella*, consisting of the primer pair of SEQ ID NOs: 1 and 2, guide RNA, and an endonuclease.

Another object of the present invention is to provide a composition for detecting *Salmonella*, consisting essentially of the primer pair of SEQ ID NOs: 1 and 2, guide RNA, and an endonuclease.

Another object of the present invention is to provide a kit for detecting *Salmonella*, comprising the composition.

Another object of the present invention is to provide a method for detecting *Salmonella*, comprising the following steps:
  (a) isolating DNA from a sample;
  (b) amplifying the DNA using the primer pair; and
  (c) detecting the amplified product.

Another object of the present invention is to provide a composition for diagnosing food poisoning.

Another object of the present invention is to provide a use of the primer pair, guide RNA, and endonuclease for manufacturing a composition for detecting *Salmonella*.

Another object of the present invention is to provide a use of a composition for manufacturing a composition for diagnosing food poisoning.

Another object of the present invention is to provide a method for diagnosing food poisoning, comprising the following steps:
  (a) isolating DNA from a sample;
  (b) amplifying the DNA using the primer pair;
  (c) detecting the amplified product; and
  (d) diagnosing food poisoning if the amplified product is detected in step (c).

However, the problems of the present invention as described above are exemplary and do not limit the scope of the present invention. Further, other objects and advantages of the present invention will become more apparent from the detailed description, claims, and drawings of the invention.

Means for Solving the Problem

To achieve the aforementioned objectives of the present invention, the invention provides a primer pair for detecting *Salmonella*, comprising a forward primer consisting of the nucleotide sequence of SEQ ID NO: 1 and a reverse primer consisting of the nucleotide sequence of SEQ ID NO: 2.

To achieve another objective of the present invention, the invention provides a composition for detecting *Salmonella*, comprising the primer pair of SEQ ID NOs: 1 and 2, guide RNA (gRNA), and an endonuclease.

To achieve another objective of the present invention, the invention provides a composition for detecting *Salmonella*, consisting of the primer pair of SEQ ID NOs: 1 and 2, guide RNA (gRNA), and an endonuclease.

To achieve another objective of the present invention, the invention provides a composition for detecting *Salmonella*, consisting essentially of the primer pair of SEQ ID NOs: 1 and 2, guide RNA (gRNA), and an endonuclease.

To achieve another objective of the present invention, the invention provides a kit for detecting *Salmonella*, comprising the composition.

To achieve another objective of the present invention, the invention provides a method for detecting *Salmonella*, comprising the following steps:
  (a) isolating DNA from a sample;
  (b) amplifying the DNA using the primer pair; and
  (c) detecting the amplified product.

To achieve another objective of the present invention, the invention provides a composition for diagnosing food poisoning.

To achieve another objective of the present invention, the invention provides the use of a primer pair, guide RNA (gRNA), and an endonuclease for manufacturing a composition for detecting *Salmonella*.

To achieve another objective of the present invention, the invention provides the use of a composition for manufacturing a composition for diagnosing food poisoning.

To achieve another objective of the present invention, the invention provides a method for diagnosing food poisoning, comprising the following steps:
  (a) isolating DNA from a sample;
  (b) amplifying the DNA using the primer pair;
  (c) detecting the amplified product; and
  (d) diagnosing food poisoning if the amplified product is detected in step (c).

Unless otherwise defined, all technical and scientific terms used herein have the same meaning as commonly understood by one of ordinary skill in the art. The following references provide one example of the general definitions of many terms used in this specification: Singleton et al., DICTIONARY OF MICROBIOLOGY AND MOLECULAR BIOLOGY (2nd ed. 1994); THE CAMBRIDGE DICTIONARY OF SCIENCE AND TECHNOLOGY (Walker ed., 1988); and Hale & Marham, THE HARPER COLLINS DICTIONARY OF BIOLOGY.

Hereinafter, the present invention will be described in detail.

The present invention provides a primer pair for detecting *Salmonella*, comprising a forward primer consisting of the nucleotide sequence of SEQ ID NO: 1 and a reverse primer consisting of the nucleotide sequence of SEQ ID NO: 2.

In the present invention, the term "primer" refers to a short nucleic acid sequence with a free 3' hydroxyl group that can form a base pair with a complementary template of *E. coli* nucleic acid and functions as a starting point for template strand replication.

The primer pair specifically amplifies the treC gene of *Salmonella*, resulting in a 202 bp amplified product, and *Salmonella* can be detected through the analysis of the amplified product.

In the present invention, the *Salmonella* may be characterized as *Salmonella Enterica* or its serovar.

In the present invention, the serovar may be selected from the group consisting of *Salmonella enteritidis*, *Salmonella typhimurium*, *Salmonella braenderup*, *Salmonella typhi*, *Salmonella thompson*, *Salmonella taintpaul*, *Salmonella paratyphi*, *Salmonella virchow*, *Salmonella senftenberg*, *Salmonella newport*, *Salmonella montevideo*, *Salmonella london*, and *Salmonella Infantis*.

According to one embodiment of the present invention, the primer pair according to the present invention was confirmed to amplify the genes of 13 serovars and 16 standard strains of *Salmonella*. Additionally, the primer pair does not amplify the genes of other microorganisms causing food poisoning, indicating very high detection specificity.

The amplification can be performed by any method used in the art to amplify the target (gene, etc.), for example, by Recombinase Polymerase Amplification (RPA), but is not limited thereto.

The amplified product may be, for example, an amplicon, but is not limited thereto.

In this specification, the term "Recombinase Polymerase Amplification (RPA)" refers to a technique that can confirm DNA and RNA amplification, which, unlike conventional PCR, uses DNA-binding proteins and recombinase to quickly and accurately amplify target sequences. RPA is similar to conventional PCR but can amplify specific genes under isothermal conditions without temperature changes, reducing reaction time, and does not require special equipment, making it cost-effective and portable for field testing. Recombinase Polymerase Amplification (RPA) uses bacteriophage T4 recombinase to cause the denaturation of double-stranded DNA and simultaneously amplifies specific DNA using DNA polymerase and specific primers. This method can amplify DNA of specific sequences using a target template and a pair of primers (oligonucleotides) like PCR, but unlike PCR, it can induce an amplification reaction under isothermal conditions within a temperature range of 37° C.-42° C. Currently, RPA has been developed to produce amplified products very quickly and is widely recognized for its application in detecting specific pathogens through specific gene amplification.

The length of RPA amplified products is recommended not to exceed 500 nucleotides (nt) and generally has a length between 100 and 250 nt. The primer length for RPA is recommended to be at least 30 nucleotides, unlike PCR, and generally uses a length of 32 to 35 nt. Additionally, RPA primers are not sensitive to the GC content (GC %) and Tm (melting temperature) value, so RPA primers may have the value of 20-70% of GC % and 50-100° C. of Tm (Analyst, 2019, 144, 31).

The present invention also provides a composition for detecting *Salmonella*, comprising the primer pair of SEQ ID NOs: 1 and 2, guide RNA (gRNA), and an endonuclease.

In the present invention, the guide RNA may be crRNA or gRNA. crRNA is called CRISPR RNA. Additionally, gRNA refers to guide RNA. crRNA and gRNA may be single-stranded RNA. Additionally, crRNA can bind to tracrRNA to activate CRISPR-associated proteins, and crRNA can be used in a form bound to tracrRNA. In this case, crRNA may have a sequence complementary to a gene sequence specifically present in *Salmonella*. Additionally, gRNA can also bind to a gene sequence specifically present in *Salmonella* to activate CRISPR-associated proteins. The crRNA or gRNA may be RNA consisting of 15 to 40 nucleotides. In one embodiment, crRNA or gRNA may consist of 24 nucleotides. Additionally, crRNA or gRNA may include additional sequences at the 3' end to activate CRISPR-associated proteins such as Cas9, Cas12, or Cas13. In one embodiment, the gRNA may be consisting of the nucleotide sequence of SEQ ID NO: 3.

In the present invention, the endonuclease may be a CRISPR-associated protein. The term 'CRISPR-associated protein' used in the present invention refers to an enzyme that can recognize and cleave nucleic acids such as DNA or RNA when they have double-stranded or single-stranded forms (dsDNA/RNA and ssDNA/RNA). Specifically, they can recognize and cleave double-stranded or single-stranded nucleic acids bound to crRNA or gRNA.

In one specific example of the present invention, the endonuclease may be activated by recognizing that gRNA is bound to the target site. Additionally, as the endonuclease function is activated, it may have exonuclease activity that can non-specifically cleave double-stranded and/or single-stranded DNA and/or RNA. Additionally, CRISPR-associated proteins such as Cas12a can exhibit non-specific exonuclease activity once activated. In such cases, DNA and RNA can be non-specifically cleaved.

Therefore, in one specific example of the composition of the present invention, *Salmonella* can be detected by the fluorescence emission of a reporter bound to a fluorescent substance, which is cleaved by a non-specific nuclease activated by the binding of crRNA or gRNA to a specific target site, more specifically the treC gene of *Salmonella*.

Specifically, one specific example of the CRISPR-associated protein may be selected from the group consisting of Cas1, Cas1B, Cas2, Cas3, Cas4, Cas5, Cas6, Cas7, Cas8, Cas9, Cas10, Cas12a, Cas12b, Cas12c, Cas12d, Cas12e, Cas12g, Cas12h, Cas12i, Cas13a, Cas13b, Cas13c, Cas13d, Cas14, Csy1, Csy2, Csy3, Cse1, Cse2, Csc1, Csc2, Csa5, Csn2, CsMT2, Csm3, Csm4, Csm5, Csm6, Cmr1, Cmr3, Cmr4, Cmr5, Cmr6, Csb1, Csb2, Csb3, Csx17, Csx14, Csx10, Csx16, CsaX, Csx3, Csx1, Csx15, Csf1, Csf2, Csf3, and Csf4, preferably selected from the group consisting of Cas9, Cas10, Cas12a, Cas12b, Cas12c, Cas12d, Cas12e, Cas12g, Cas12h, Cas12i, Cas13a, Cas13b, Cas13c, and Cas13d, more preferably selected from the group consisting of Cas12a, Cas12b, Cas12c, Cas12d, Cas12e, Cas12g, Cas12h, and Cas12i, and most preferably Cas12a (Cpf1).

In one aspect of the present invention, the composition may further comprise a reporter gene.

In the present invention, the reporter gene is preferably bound to a fluorescent substance, and the fluorescent substance may be selected from the group consisting of FAM, TET, JOE, YAKYE, HEX, CY3, ATTO550, TAM, ROX, TxRed, CY35, LC610, LC640, ATTO647N, CY5, VIC, evergreen dye, and ATTO680, but is not limited thereto.

In one aspect of the present invention, the composition may be used in a method for detecting *Salmonella* by an isothermal amplification reaction and a subsequent CRISPR gene editing reaction.

Specifically, if the target site is present in the amplified product amplified through the primer pair consisting of the nucleotide sequences of SEQ ID NOs: 1 and 2, the guide RNA binds complementarily to the target site, and the endonuclease, preferably the CRISPR-associated protein, is activated to cleave the sequence of the reporter gene. As a result, the fluorescent substance bound to the reporter gene emits fluorescence, and *Salmonella* can be detected through this.

The present invention also provides a kit for detecting *Salmonella*, comprising the composition.

The kit may be a kit comprising essential elements necessary for performing *Salmonella* detection, and in addition to the composition, it may include test tubes or other suitable containers, reaction buffers (various pH and magnesium concentrations), deoxynucleotides (dNTPs), enzymes such as Taq-polymerase, DNase, RNAse inhibitors, DEPC-water, and sterile water.

The present invention also provides a method for detecting *Salmonella*, comprising the following steps:
 (a) isolating DNA from a sample;
 (b) amplifying the DNA using the primer pair; and
 (c) detecting the amplified product.

In the present invention, the "sample" refers to a material or organism used for testing, examination, or analysis, and is not limited in type, but may be a food or biological sample suspected of containing *Salmonella*.

In the present invention, the biological sample may include tissue, cells, whole blood, serum, plasma, cerebrospinal fluid, colostrum, joint fluid, saliva, feces, cell culture supernatant, etc., but is not limited thereto.

The isolation of DNA from the sample can be performed using conventional known DNA isolation methods. If the starting material is gDNA, the isolation of gDNA can be performed according to conventional methods known in the art, and if the starting material is mRNA, it can be synthesized into cDNA using reverse transcriptase. For example, the DNA isolation is not particularly limited as long as it is a method for isolating genomic DNA (gDNA) from a sample. For example, commercially available DNA isolation kits such as the DNeasy mini kit from Qiagen can be used.

In the present invention, the "amplification" may be selected from the group consisting of PCR, RT-PCR, and isothermal amplification, preferably isothermal amplification.

The "isothermal amplification" refers to a method for amplifying a target nucleic acid sequence (template) under constant reaction temperature conditions, and may be selected from the group consisting of recombinase polymerase amplification (RPA), loop-mediated isothermal amplification (LAMP), helicase-dependent amplification (HDA), rolling circle amplification (RCA), multiple displacement amplification (MDA), strand displacement amplification (SDA), and nucleic acid sequence-based amplification (NASBA), preferably recombinase polymerase amplification (RPA).

The detection of the amplified product can be performed through capillary electrophoresis, DNA chips, gel electrophoresis, radiometric measurement, fluorescence measurement, or phosphorescence measurement, but is not limited thereto.

As one method for detecting the amplified product, for example, capillary electrophoresis can be performed. Capillary electrophoresis can be performed using, for example, an ABi Sequencer. Additionally, gel electrophoresis can be performed, and gel electrophoresis can use agarose gel electrophoresis or acrylamide gel electrophoresis depending on the size of the amplified product. Additionally, the fluorescence measurement method can label the 5'-end of the primer with Cy-5 or Cy-3 to perform PCR, and the target sequence can be detected with a fluorescent label, and the labeled fluorescence can be measured using a fluorescence detector. Additionally, the radiometric measurement method can label the amplified product by adding radioactive isotopes such as $^{32}P$ or $^{35}S$ to the PCR reaction solution during PCR, and measure the radioactivity using a radiometric measuring device, such as a Geiger counter or a liquid scintillation counter. Additionally, the RPA amplified product can be obtained and separated by methods such as agarose gel electrophoresis, and the presence of DNA corresponding to the length of the DNA polymerized by the primer set used, specifically DNA with a length of 202 bp, can be confirmed to detect *Salmonella*.

In one aspect of the present invention, after step (b), the method may further comprise the step of mixing the amplified product with a composition comprising guide RNA, endonuclease, and a reporter gene.

In this case, the presence of *Salmonella* can be confirmed by detecting the fluorescence reaction of the reporter gene according to the gene editing reaction by the guide RNA and endonuclease.

The present invention also provides a composition for diagnosing food poisoning.

The present invention provides the use of a primer pair, guide RNA (gRNA), and an endonuclease for manufacturing a composition for detecting *Salmonella*.

The present invention provides the use of a composition for manufacturing a composition for diagnosing food poisoning.

The present invention provides a method for diagnosing food poisoning, comprising the following steps:
 (a) isolating DNA from a sample;
 (b) amplifying the DNA using the primer pair;
 (c) detecting the amplified product; and
 (d) diagnosing food poisoning if the amplified product is detected in step (c).

In one embodiment, the present invention provides a method for diagnosing and treating food poisoning in a sample, comprising the following steps:
 (i) isolating DNA from a sample;
 (ii) amplifying the DNA using the primer pair;
 (iii) detecting the amplified product;
 (iv) diagnosing food poisoning if the amplified product is detected in step (iii); and
 (v) administering a therapeutic drug or performing surgery to treat the disease in the diagnosed sample.

The methods comprising steps (i) to (v) are understood in accordance with the methods comprising steps (a) to (d) described above.

Step (v) is a step of treating the disease by administering a therapeutic drug such as ciprofloxacin, azithromycin, or ceftriaxone, or by surgical means to the sample diagnosed with the disease in step (iv).

The "treatment" in the present invention comprehensively refers to improving food poisoning or its symptoms, and may include curing, substantially preventing, or improving the condition, and may include alleviating, curing, or preventing one or more symptoms derived from the disease, but is not limited thereto.

The "sample" in the present invention is obtained from a sample suspected of having the disease, and may be selected from the group consisting of cells, tissues, blood, serum, plasma, saliva, sputum, mucous fluid, and urine, but is not limited thereto. The "sample" or "subject" may be an animal, preferably a mammal, particularly an animal including a human, and may be cells, tissues, organs, etc., derived from the animal. The sample may be a patient in need of the therapeutic effect.

The term "diagnosis" as used herein includes determining whether a subject currently has a specific disease or condition, or determining the prognosis of a subject with a specific disease or condition.

The term "comprising" as used herein is synonymous with "including" or "characterized by," and does not exclude additional components or steps not specifically mentioned in the composition or method according to the present invention. The term "consisting of" means excluding additional elements, steps, or components not specifically described. The term "consisting essentially of" means that the composition or method may include additional elements or steps that do not materially affect the basic characteristics of the composition or method.

The composition comprising the primer pair and guide RNA provided by the present invention can specifically detect *Salmonella*, and thus, using this, *Salmonella* in a biological sample to be diagnosed (e.g., feces, blood, etc.) can be quickly and accurately detected, allowing for the rapid and accurate diagnosis of diseases caused by *Salmonella* infection, specifically food poisoning.

Effects of the Invention

The primer pair provided by the present invention, or the use of the primer pair and guide RNA, enables the rapid detection of *Salmonella* bacteria in a sample with very high sensitivity and specificity. Additionally, it allows for the simultaneous detection of 13 serotypes of *Salmonella* bacteria that are clinically significant in causing diseases, making it highly applicable in both food and clinical fields.

BRIEF DESCRIPTION OF THE DRAWINGS

FIG. 1*a* to 1*f* are diagrams sequentially illustrating the gRNA selection process for detecting *Salmonella* bacteria.

FIGS. 2*a* and 2*b* show the results of RPA primers for the selected three gRNA candidates and evaluating the amplification capability of genes isolated from 13 serotypes and 16 standard *Salmonella* strains.

FIGS. 3*a* and 3*b* illustrate the results of amplifying genes isolated from 13 serotypes and 16 standard *Salmonella* strains using the selected gRNA target RPA primer pairs, and detecting the amplified products using gRNA and CRISPR-Cas12a.

FIG. 4 shows the results of evaluating detection specificity by performing detection reactions on various foodborne pathogens indicated in the drawings using the selected gRNA target RPA primer pairs, gRNA, and CRISPR-Cas12a.

DETAILED DESCRIPTION OF THE INVENTION

Figure 1A:
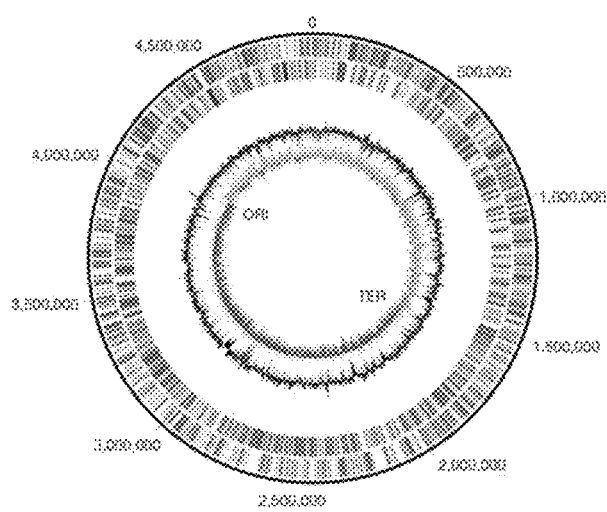
Figure 1B:
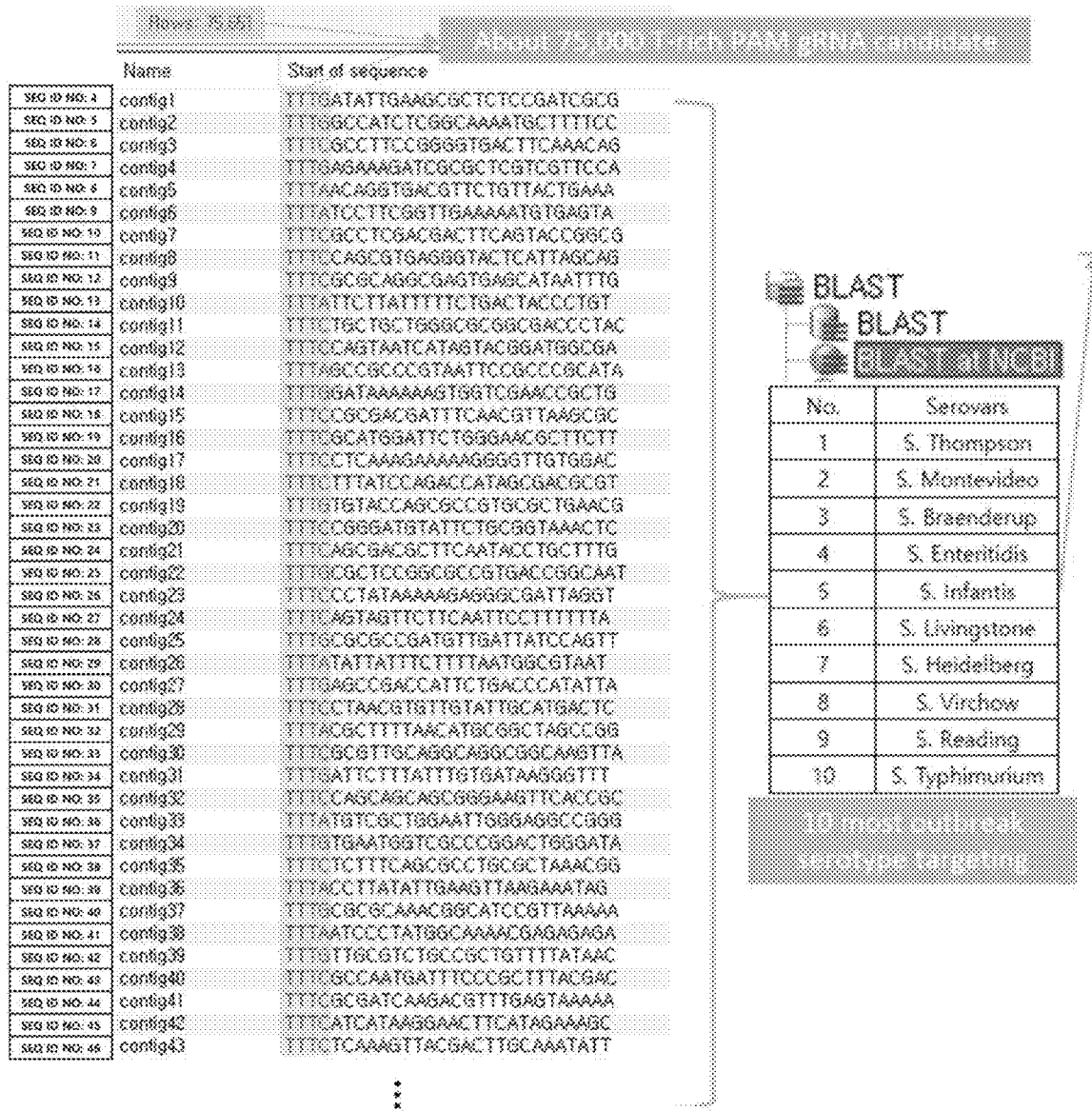
Figure 1C:
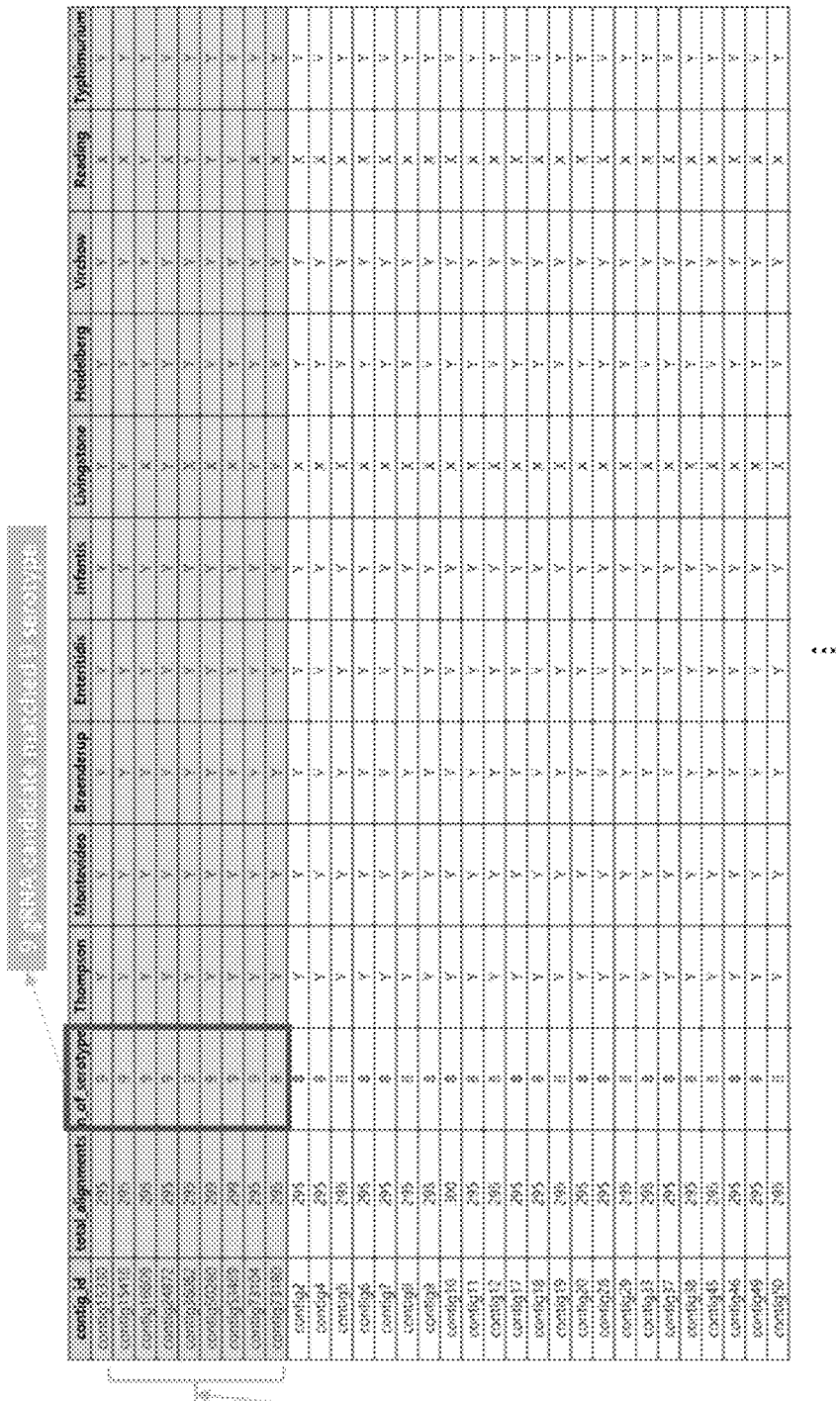
Figure 1D:
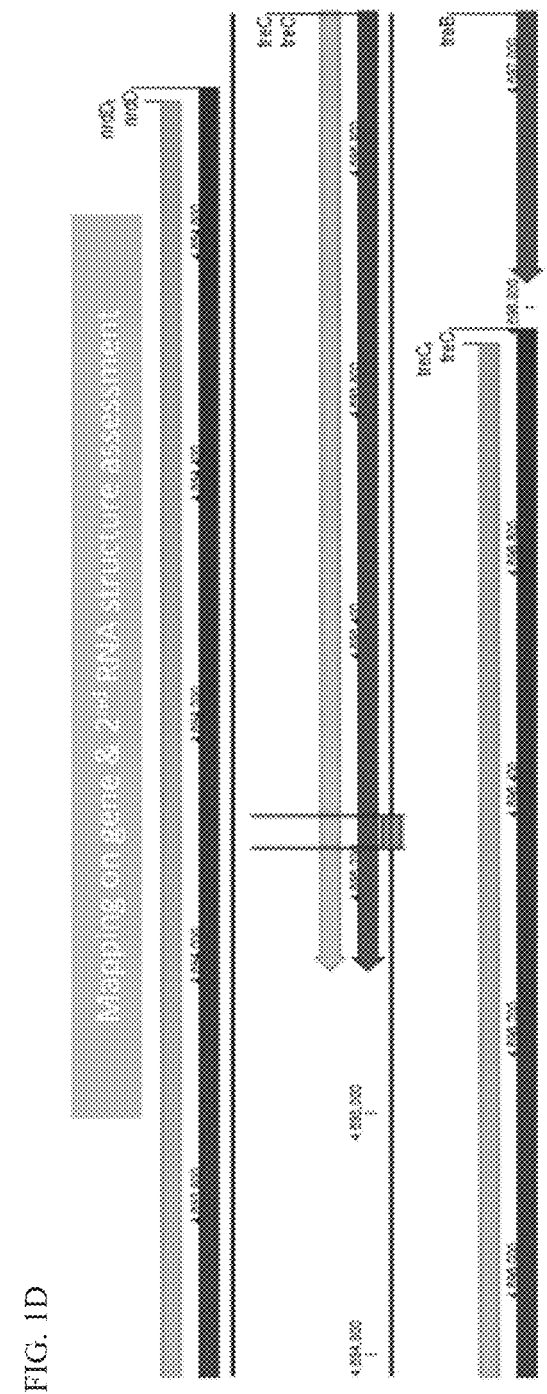
Figure 1E:
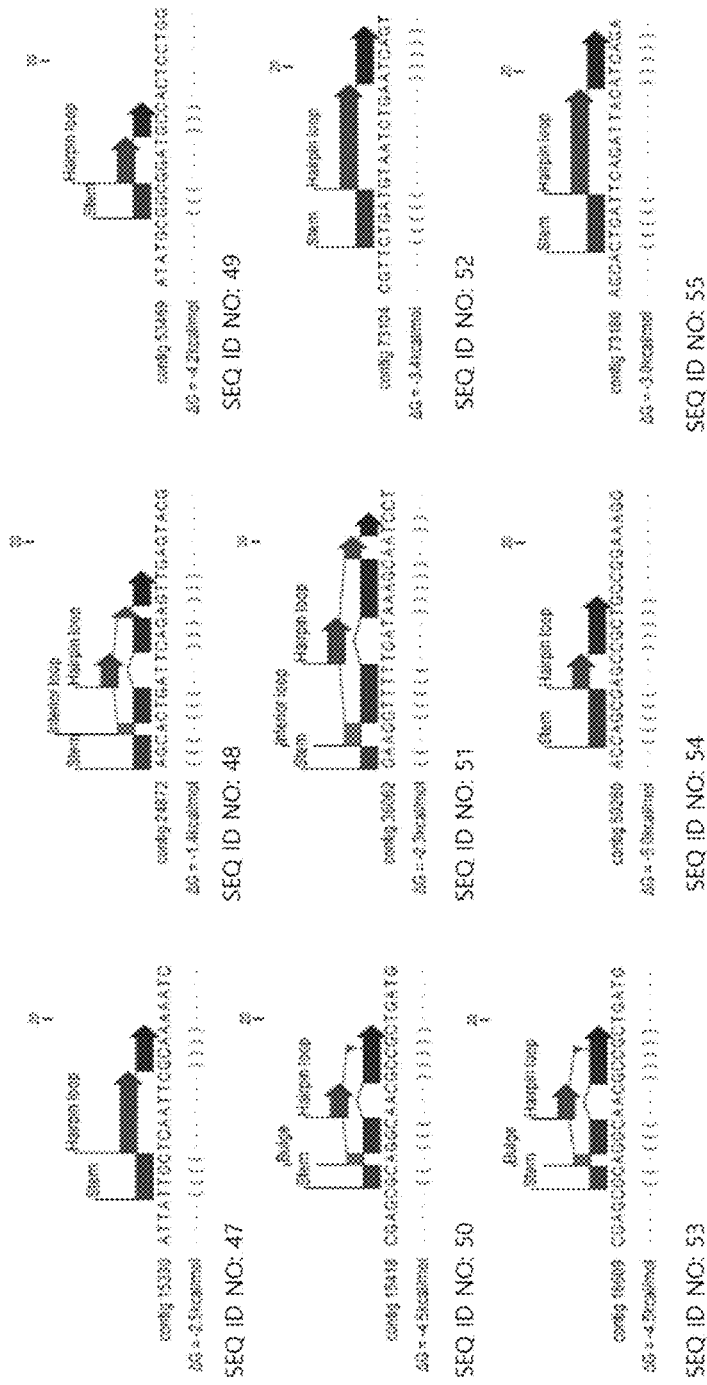

Hereinafter, preferred embodiments are provided to aid in the understanding of the present invention. However, the following embodiments are provided merely to facilitate understanding of the present invention and are not intended to limit the scope of the invention.

Example 1: Primary Selection of gRNA for *Salmonella* Detection

The core of research in the diagnostic field using CRISPR gene-editing technology comprises the applied Cas protein and gRNA. In this study, we selected cpf1 (Cas12a), which has activity on dsDNA and is known to require a T-rich PAM (TTTV) within the target.

Through bioinformatics techniques, we secured 75,651 gRNA candidates with T-rich PAM+24 nt for the *Salmonella enterica* subsp. *enterica* serovar *Typhimurium* str. LT2 ref. genome (NC_003197).

Among 32 serotypes of *Salmonella* isolated from domestic food, clinical, and environmental sources from 2012 to 2018, we identified 9 gRNA candidates that commonly match 9 serotypes (*S. thompson, S. montevideo, S. braenderup, S. enteretidis, S. infantis, S. Livingstone, S. Heidelberg, S. Virchow, S. Typhimurium*) through gRNA matching that can simultaneously identify the top 10 serotypes (*S. Thompson, S. Montevideo, S. Braenderup, S. Enteretidis, S. Infantis, S. Livingstone, S. Heidelberg, S. Virchow, S. Reading, S. Typhimurium*), which account for 88.8% of all strains (Reference: Food Poisoning Bacteria Characteristic Analysis Report—*Salmonella* spp. —2019, Ministry of Food and Drug Safety, Food and Drug Safety Evaluation Institute).

We then filtered these to 3 gRNA candidates with good secondary structures that map to genes on the *Salmonella enterica* subsp. *enterica* serovar *Typhimurium* str. LT2 ref. genome (FIGS. 1a to f).

Example 2: Design of RPA Primers and Secondary Selection of gRNA

For the 3 gRNA candidates selected in Example 1, RPA primers were designed, and RPA amplification experiments were conducted using 13 serotypes and 16 standard *Salmonella* strains. 1 gRNA (treC) that showed amplification across all samples was selected (FIGS. 2a and b).

Figure 3A:
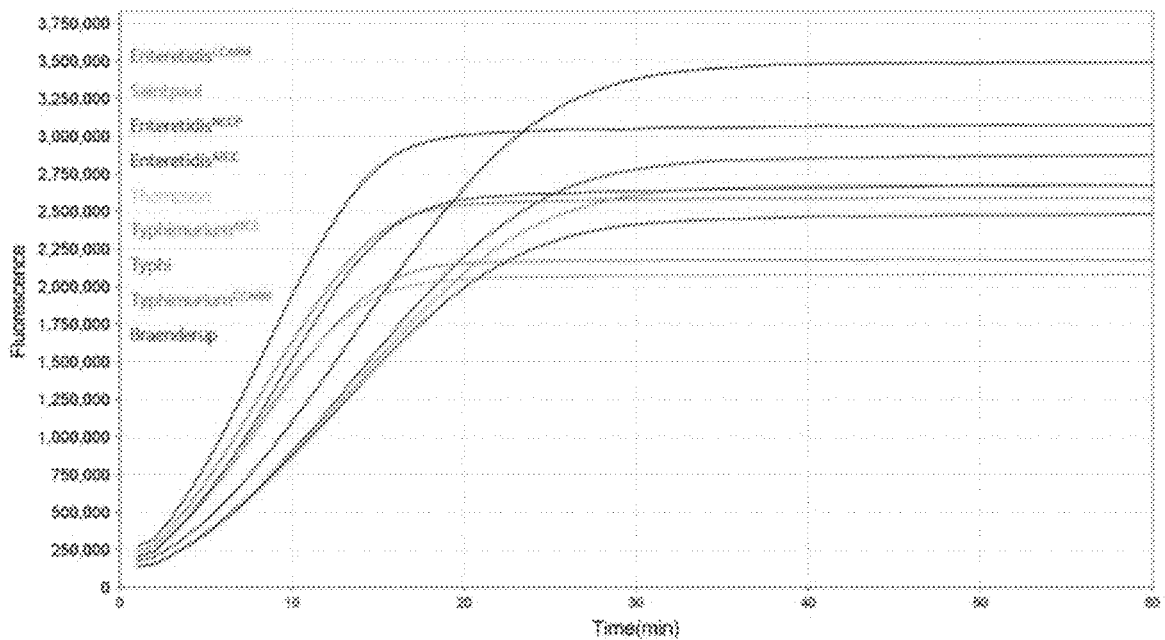

Example 3: Detection Experiment of *Salmonella* Using RPA Primers, gRNA, and CRISPR-Cas12a Using the RPA primer pairs targeting the selected gRNA, we conducted reactions applying gRNA and CRISPR-Cas12a on the amplicons from 13 serotypes and 16 standard *Salmonella* strains. The detailed reaction conditions are shown in Table 1. The mixture prepared according to the protocol was measured every minute using a 37° C. isothermal fluorescence detector, and the results are shown in FIGS. 3a and b.

TABLE 1

| Components | Stock conc. | Final conc.(Tube) |
| --- | --- | --- |
| buffer | 10 x | 1 x |
| gRNA | 10 μM | 0.5 μM |
| Cpf1 | 1 μM | 0.05 Mm |
| ssDNA reporter | 10 μM | 0.5 μM |

TABLE 1-continued

| Components | Stock conc. | Final conc.(Tube) |
| --- | --- | --- |
| Rnase inhibitor | 40 U/μL | 10 U |
| Sterile water | | Add to total reaction volume of 18 μL |
| RPA amplicon | | Add 2 μL |

Figure 3B:
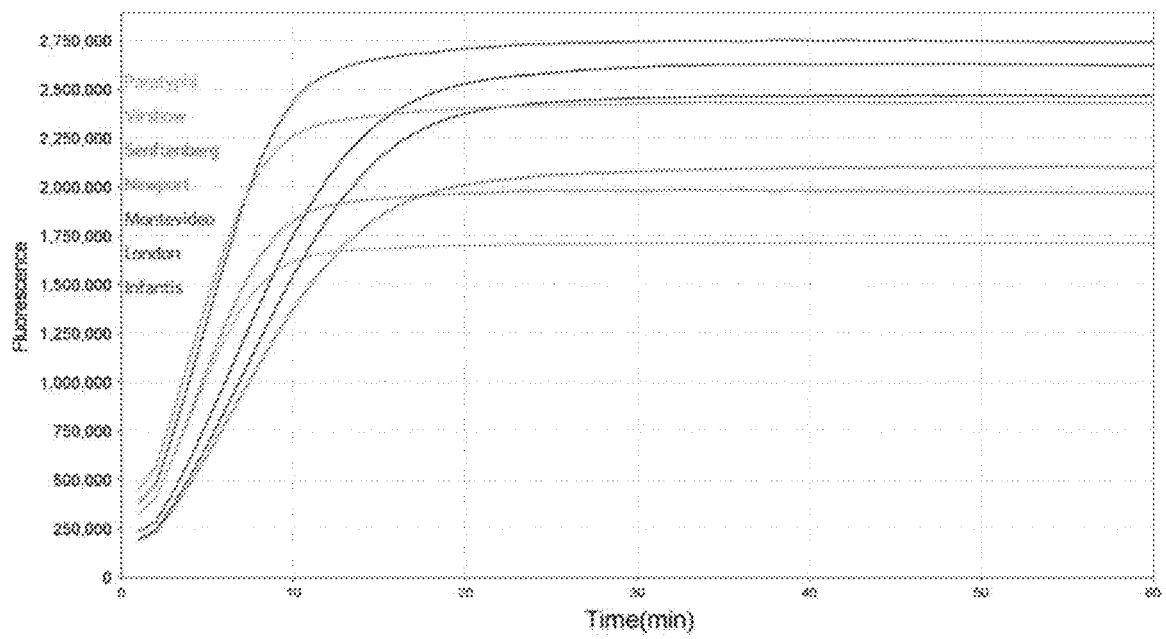

As shown in FIG. 3, the primer pairs and gRNA selected in Example 2 demonstrated rapid detection speed and good fluorescence values for 13 serotypes and 16 standard *Salmonella* strains.

Example 4: Evaluation of Detection Specificity Using RPA Primers, gRNA, and CRISPR-Cas12a To verify that the gRNA selected in Example 2 can specifically detect only *Salmonella*, DNA extraction was performed on 24 representative non-*Salmonella* foodborne pathogens. Amplification was conducted using the RPA primer pairs selected in Example 2, and the reaction mixture was prepared according to the protocol in Table 1 using the gRNA selected in Example 2. Measurements were taken every minute for 1 hour using a 37° C. isothermal fluorescence detector, and the results are shown in FIG. 4.

As shown in FIG. 4, the specificity test results for 24 representative non-*Salmonella* foodborne pathogens confirmed that no detection occurred, indicating that the selected gRNA and RPA primers specifically detect only *Salmonella*.

Additionally, diagnosis was possible at 37° C. from RPA (approximately 20 minutes) to CRISPR detection (approximately 20 minutes), confirming that the RPA primer pairs (Sequence Nos. 1 and 2) and gRNA (Sequence No. 3) composition can be utilized for rapid diagnosis of *Salmonella*.

Example 5: Evaluation of Detection Sensitivity Using RPA Primers, gRNA, and CRISPR-Cas12a To verify the detection sensitivity of the selected gRNA and RPA primers for *Salmonella*, amplicons for *Salmonella enterica* subsp. *enterica* serovar *Enteritidis* (ATCC 13076) were obtained through PCR using the RPA primer pairs selected in Example 2. Standard plasmid DNA was then prepared from these amplicons. The prepared plasmid DNA was serially diluted to concentrations of 1 nM, 1 pM, 1 fM, 500 aM, 100 aM, 10 aM, 1 aM, and $10^6$ copies, 105 copies, 104 copies, 103 copies, $10^2$ copies, 10 copies, 1 copy. RPA and CRISPR detection sensitivity evaluations were conducted using the RPA primer pairs and gRNA selected in Example 2, and the results are shown in FIG. 5.

Figure 5:
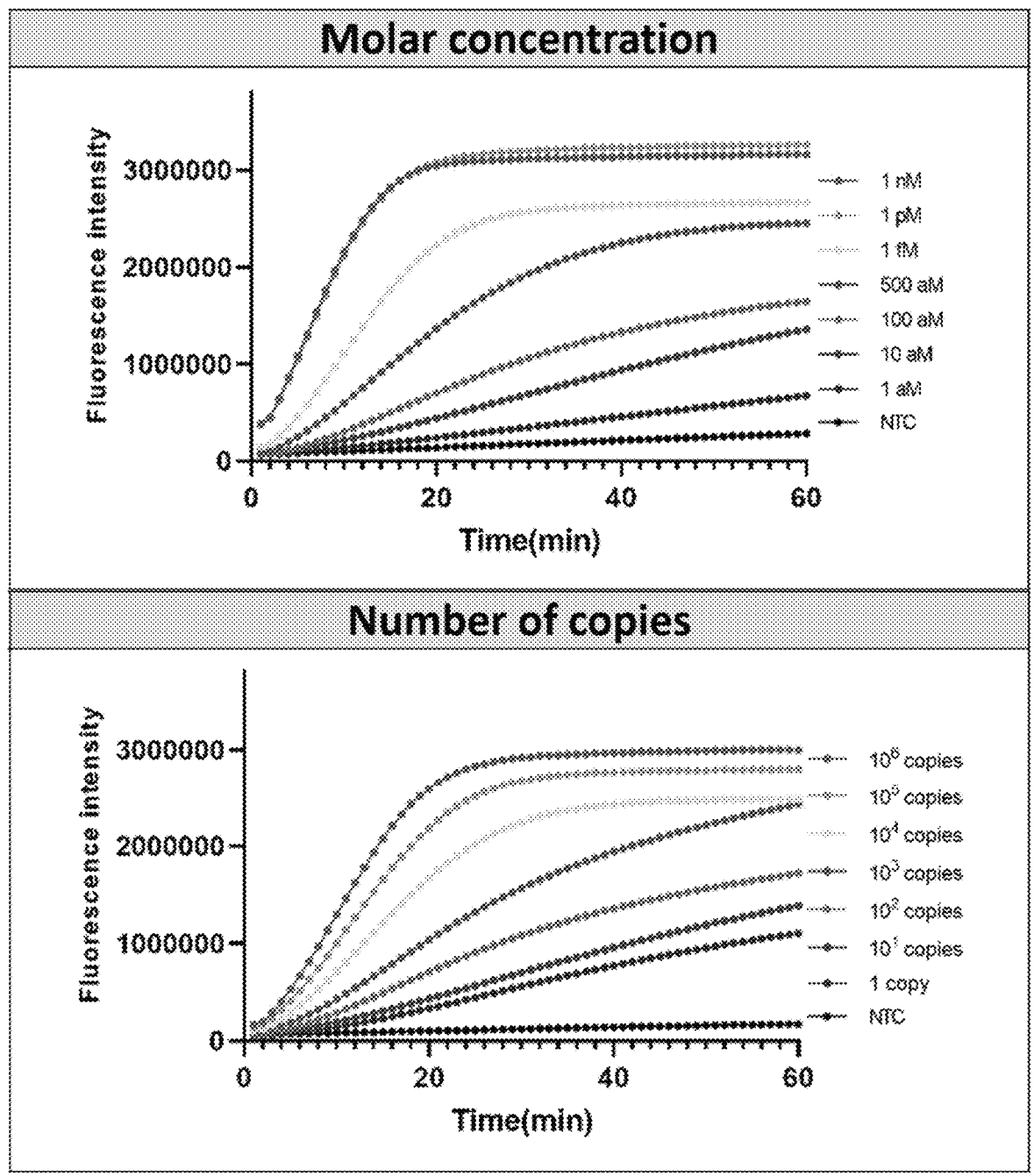
FIG. 5 shows the results of evaluating the detection sensitivity for *Salmonella* bacteria by applying PCR with the selected gRNA RPA primer pairs to detect *Salmonella enterica* subsp. *enterica* serovar *Enteritidis* (ATCC 13076) in order to verify the detection sensitivity of the selected gRNA and RPA primers.

As shown in FIG. 5, it was confirmed that *Salmonella* can be detected with high sensitivity at levels of 1 aM ($10^{-18}$ molar) and 1 copy within approximately 20 minutes after the initiation of the CRISPR-Cas reaction.

INDUSTRIAL APPLICABILITY

The primer pair or the primer pair and guide RNA, provided by the present invention, have the ability to rapidly detect *Salmonella* in a sample with very high sensitivity and specificity. Additionally, it can simultaneously detect 13 serotypes of *Salmonella* that frequently cause clinical diseases, making it highly applicable in the food and clinical fields, thus having high industrial applicability.

What is claimed is:

1. A composition for detecting *Salmonella* spp., comprising a primer pair capable of amplifying the sequence ATATGCGGCGGATGCCACTCCTGG (SEQ ID NO: 58) or a sequence complementary thereto in the trehalose 6-phosphate hydrolase (treC) gene of *Salmonella* spp., guide RNA comprising the nucleotide sequence of SEQ ID NO: 3, reporter gene conjugated with a fluorescent substance, and endonuclease, wherein the endonuclease is Cas12.

2. The composition of claim 1, wherein the primer pair comprises a forward primer consisting of the nucleotide sequence of SEQ ID NO: 1 and a reverse primer consisting of the nucleotide sequence of SEQ ID NO: 2.

3. The composition of claim 1, wherein the *Salmonella* spp. is *Salmonella enterica* or a serovar thereof.

4. The composition of claim 3, wherein the serovar is selected from the group consisting of *Salmonella Enteritidis, Salmonella Typhimurium, Salmonella Braenderup, Salmonella Typhi, Salmonella Thompson, Salmonella Saintpaul, Salmonella Paratyphi, Salmonella Virchow, Salmonella Senftenberg, Salmonella Newport, Salmonella Montevideo, Salmonella London,* and *Salmonella Infantis.*

5. The composition of claim 1, wherein the endonuclease is selected from the group consisting of Cas12a, Cas12b, Cas12c, Cas12d, Cas12e, Cas12g, Cas12h, and Cas12i.

6. The composition of claim 1, wherein the fluorescent substance is selected from the group consisting of FAM, TET, JOE, YAKYE, HEX, CY3, ATTO550, TAM, ROX, TxRed, CY35, LC610, LC640, ATTO647N, CY5, VIC, evergreen dye, and ATTO680.

7. The composition of claim 1, wherein the composition detects *Salmonella* spp. through an isothermal amplification reaction followed by a CRISPR gene-editing reaction.

8. A kit for detecting *Salmonella* spp., comprising the composition of claim 1.

9. A method for detecting *Salmonella* spp., comprising the steps of:
   (a) isolating a nucleic acid from a sample;
   (b) amplifying the nucleic acid using a primer pair capable of amplifying the sequence ATATGCGGCGGATGCCACTCCTGG (SEQ ID NO: 58) or a sequence complementary thereto in the trehalose 6-phosphate hydrolase (treC) gene of *Salmonella* spp., and mixing the amplified product with a composition comprising a guide RNA, an endonuclease, and a reporter gene conjugated with a fluorescent substance, wherein the endonuclease is Cas12; and
   (c) detecting the amplified product.

10. The method of claim 9, wherein the amplification is an isothermal amplification.

11. The method of claim 10, wherein the isothermal amplification is recombinase polymerase amplification (RPA).

12. The method of claim 9, wherein the sample is a food or biological sample.

13. A composition for diagnosing food poisoning, comprising the composition of claim 1.

14. The composition of claim 13, wherein the food poisoning is caused by *Salmonella* spp. infection.

* * * * *